(12) United States Patent
Xu et al.

(10) Patent No.: US 11,550,769 B2
(45) Date of Patent: Jan. 10, 2023

(54) DATA PROCESSING METHOD, APPARATUS, AND SYSTEM

(71) Applicant: Huawei Technologies Co., Ltd., Shenzhen (CN)

(72) Inventors: Wenhua Xu, Shenzhen (CN); Yonglin Xia, Shenzhen (CN); Yan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 16/913,600

(22) Filed: Jun. 26, 2020

(65) Prior Publication Data

US 2020/0327107 A1 Oct. 15, 2020

Related U.S. Application Data

(63) Continuation of application No. PCT/CN2018/105875, filed on Sep. 15, 2018.

(30) Foreign Application Priority Data

Dec. 29, 2017 (CN) .......................... 201711487277.1

(51) Int. Cl.
*G06F 16/22* (2019.01)
*G06F 16/2457* (2019.01)
(Continued)

(52) U.S. Cl.
CPC ........ *G06F 16/2228* (2019.01); *G06F 16/235* (2019.01); *G06F 16/248* (2019.01);
(Continued)

(58) Field of Classification Search
CPC ........... G06F 16/2228; G06F 16/24573; G06F 16/24552; G06F 16/235; G06F 16/288; G06F 16/248
(Continued)

(56) References Cited

U.S. PATENT DOCUMENTS 7,092,933 B1   8/2006   Milby
8,606,752 B1 * 12/2013 Beatty ................. G06F 16/2365
                                                           707/640

(Continued)

FOREIGN PATENT DOCUMENTS

CN    103853727 A    6/2014
CN    104156396 A    11/2014
(Continued)

*Primary Examiner* — Joshua Bullock
(74) *Attorney, Agent, or Firm* — Conley Rose, P.C.

(57) ABSTRACT

A data processing method, apparatus, and system, where the method includes: receiving a data insertion request sent by service software, where the data insertion request includes a data record, and the data record includes an object type identifier, a field value, a field identifier, and an object instance identifier; generating a field index based on the object type identifier, the field value, and the object instance identifier; generating a relationship index based on the object type identifier; writing the data record to a database; and caching an index record and an operation for the index record into a cache apparatus, where the index record includes the relationship index and the field index. Using the foregoing solution, high-performance data processing of a flat-wide table is implemented.

20 Claims, 8 Drawing Sheets

(51) Int. Cl.
*G06F 16/2455* (2019.01)
*G06F 16/23* (2019.01)
*G06F 16/28* (2019.01)
*G06F 16/248* (2019.01)

(52) U.S. Cl.
CPC .. *G06F 16/24552* (2019.01); *G06F 16/24573* (2019.01); *G06F 16/288* (2019.01)

(58) Field of Classification Search
USPC ........................................................ 707/737
See application file for complete search history.

(56) References Cited

U.S. PATENT DOCUMENTS

| | | | |
|---|---|---|---|
| 2002/0147727 A1 | 10/2002 | Schreiber | |
| 2009/0043733 A1* | 2/2009 | Kingsford | G06F 16/2228 |
| 2010/0262631 A1 | 10/2010 | Andersson et al. | |
| 2011/0082864 A1* | 4/2011 | Banister | G06F 16/972 |
| | | | 707/741 |
| 2017/0147628 A1* | 5/2017 | Park | G06F 16/27 |
| 2021/0173843 A1* | 6/2021 | Ziebell | H04L 9/50 |

FOREIGN PATENT DOCUMENTS

| | | |
|---|---|---|
| CN | 104216975 A | 12/2014 |
| CN | 105653720 A | 6/2016 |
| CN | 106484684 A | 3/2017 |
| CN | 106599158 A | 4/2017 |
| CN | 106897335 A | 6/2017 |
| CN | 108228817 A | 6/2018 |
| EP | 2199935 A2 | 6/2010 |

\* cited by examiner

DATA PROCESSING METHOD, APPARATUS, AND SYSTEM

CROSS-REFERENCE TO RELATED APPLICATIONS

This application is a continuation of International Patent Application No. PCT/CN2018/105875, filed on Sep. 15, 2018, which claims priority to Chinese Patent Application No. 201711487277.1, filed on Dec. 29, 2017. The disclosures of the aforementioned applications are hereby incorporated by reference in their entireties.

TECHNICAL FIELD

This application relates to the field of computer technologies, and in particular, to a data processing method, apparatus, and system.

BACKGROUND

In various software (for example, customer relationship management (CRM)) services based on Software-as-a-Service (SaaS), each enterprise (which may also be referred to as a tenant) has a personalized requirement, and needs to perform customization development on baseline version (which may also be referred to as basic version) software. The customization development may include customization of a data model, service logic, and a foreground page.

Customization development of the data model is used as an example. The customization development includes table customization development, field customization development, index customization development, and the like. A solution for implementing the customization development is directly modifying a model of a database table. Modification of the model of the database table affects a live-network service. In addition, in a logical multi-tenant scenario, to be specific, in a scenario in which tenants share a data table, a conflict occurs when the plurality of tenants modify a model of the same database table.

SUMMARY

Embodiments of this application provide a data processing method, apparatus, and system, to implement high-performance data processing of a flat-wide table.

To achieve the foregoing objective, the embodiments of the present disclosure provide the following technical solutions.

According to a first aspect, a data processing method is provided. The method includes: receiving a data insertion request sent by service software, where the data insertion request includes a data record, and the data record includes an object type identifier, a field value, a field identifier, and an object instance identifier; generating a field index based on the object type identifier, the field value, and the object instance identifier; generating a relationship index based on the object type identifier; writing the data record to a database; and caching an index record and an operation for the index record into a cache apparatus, where the index record includes the relationship index and the field index. In this solution, a data record of a flat-wide table is written in two phases. In the first phase, the data record is inserted into the database, and an index record is cached into the cache apparatus. In the second phase, a scheduled task is used to synchronize the index record from the cache apparatus to the database in batches and in a scheduled manner. In this way, high-performance writing of a flat-wide table to the database is implemented.

In a possible design, generating a field index based on the object type identifier, the field value, and the object instance identifier includes: obtaining field metadata based on the object type identifier; and generating the field index based on the field metadata, the field value, and the object instance identifier, where the field index includes a unique index or a non-unique index.

In a possible design, generating a relationship index based on the object type identifier includes: obtaining relational metadata based on the object type identifier, where the relational metadata includes a relationship between a parent object and a child object, and the relationship between the parent object and the child object includes an object type identifier of the parent object, an object type identifier of the child object, a field identifier associated with the parent object, and a field identifier associated with the child object; obtaining the relationship between the parent object and the child object and the object type identifier of the child object from the relational metadata; obtaining a list of all child object instances from a parent object instance based on the object type identifier of the child object; traversing the list of child object instances and generating a relationship index for each pair of parent object instance and child object instance; and generating a relationship index record based on all relationship indexes of the parent object, where the relationship index record includes a parent object type identifier, a parent object instance identifier, and all the relationship indexes of the parent object.

In a possible design, caching an index record and an operation for the index record into a cache apparatus includes separately caching the index record and the operation for the index record into the cache apparatus in chronological order of the operation for the index record.

In a possible design, an index persistence apparatus writes the index record and the operation for the index record in the cache apparatus to the database when a predetermined time arrives.

In a possible design, that the index persistence apparatus writes the index record and the operation for the index record in the cache apparatus to the database includes: obtaining, by the index persistence apparatus in chronological order of the operation, the index record and the operation for the index record that are stored in the cache apparatus; generating, by the index persistence apparatus, a database operation statement based on the index record and the operation for the index record; and sending the database operation statement to the database.

In a possible design, the method further includes: receiving a data operation request sent by the service software, where the data operation request includes the object type identifier, the field value, and the field identifier; obtaining relational data based on the object type identifier and the field identifier, where the relational data includes object instance identifiers of all child objects associated with a parent object; obtaining an object instance identifier list based on the relational data, where the object instance identifier list includes the object instance identifiers of all the child objects associated with the parent object in the relational data; and performing a data operation on the database based on the object instance identifier list.

In a possible design, field metadata may be queried for based on the object type identifier and the field identifier, that the field index is a unique index or a non-unique index may be determined, and an index query request may be generated, where the index query request includes the object type identifier, the field identifier, and the field value. Additionally, the index query request is sent to the cache apparatus when the field index is a unique index, a first index query response returned by the cache apparatus is received, and whether the first index query response includes the object instance identifier is determined. The relational data is obtained if the first index query response includes the object instance identifier. The index query request is sent to the database if the first index query response does not include the object instance identifier, a second index query response sent by the database is received, the relationship data is obtained if it is determined that the second index query response includes the object instance identifier. The index query request is sent to both the cache apparatus and the database when the field index is a non-unique index; a third index query response sent by the cache apparatus and a fourth index query response sent by the database are separately received; an object instance identifier included in the third index query response and an object instance identifier included in the fourth index query response are separately obtained, and an object instance identifier set is formed, where the object instance identifier set includes the object instance identifier included in the third index query response and the object instance identifier included in the fourth index query response; and the relational data is obtained. In this embodiment of the present disclosure, relational data is combined, and only one piece of relational data of a root object is reserved, such that performance of adding, querying for, or deleting a relationship index is improved.

In a possible design, relational metadata may be queried for based on the object instance identifier or the object instance identifiers included in the object instance identifier set, that an object corresponding to the object instance identifier includes an associated child object may be determined, a relationship query request may be sent to the cache apparatus to query for relational data, and a first relationship query response sent by the cache apparatus may be received. When the first relationship query response includes relational data, the relationship data is obtained, When the first relationship query response includes no relational data, a relationship query request is sent to the database to query for relational data, a second relationship query response sent by the database is received, and the relational data is obtained from the second relationship query response.

In a possible design, the data operation request may be a data query request. Additionally, the method further includes obtaining a data record set of all object instances in the object instance identifier list from the database based on the object instance identifier list.

In a possible design, when the data operation request is a data deletion request, the method further includes separately deleting, based on the object instance identifier list, index records that are of all object instances in the object instance identifier list and that are in the database and the cache apparatus.

According to a second aspect, an embodiment of the present disclosure provides an apparatus. The apparatus for implementing data processing has a function of implementing the foregoing method embodiment. The function may be implemented by hardware, or may be implemented by hardware by executing corresponding software. The hardware or the software includes one or more modules corresponding to the foregoing function.

According to a third aspect, an embodiment of the present disclosure provides a data processing apparatus, including: a processor, a memory, a bus, and a communications interface. The memory is configured to store a computer executable instruction. The processor and the memory are connected to each other using the bus. When the apparatus is run, the processor executes the computer executable instruction stored in the memory, such that the apparatus for implementing data processing performs the data processing method according to any possible design of the first aspect.

According to a fourth aspect, an embodiment of the present disclosure provides a system for implementing data processing. The system includes the data processing apparatus and the cache apparatus in the foregoing method embodiment or apparatus embodiment.

According to a fifth aspect, an embodiment of the present disclosure provides a computer storage medium configured to store a computer software instruction used by the foregoing data processing apparatus or cache apparatus. The computer software instruction includes a program that is used to perform the foregoing aspects and that is designed for the data processing apparatus or the cache apparatus.

According to a sixth aspect, an embodiment of the present disclosure provides a computer program product. The computer program product includes a computer software instruction, and the computer software instruction may be loaded by a processor to implement a procedure in the data processing method according to any possible design of the first aspect.

In addition, for technical effects brought by any design in the second aspect to the sixth aspect, refer to technical effects brought by different designs in the first aspect. Details are not described herein again.

These aspects or other aspects of the present disclosure are clearer and more comprehensible in descriptions of the following embodiments.

DESCRIPTION OF EMBODIMENTS

Figure 1:
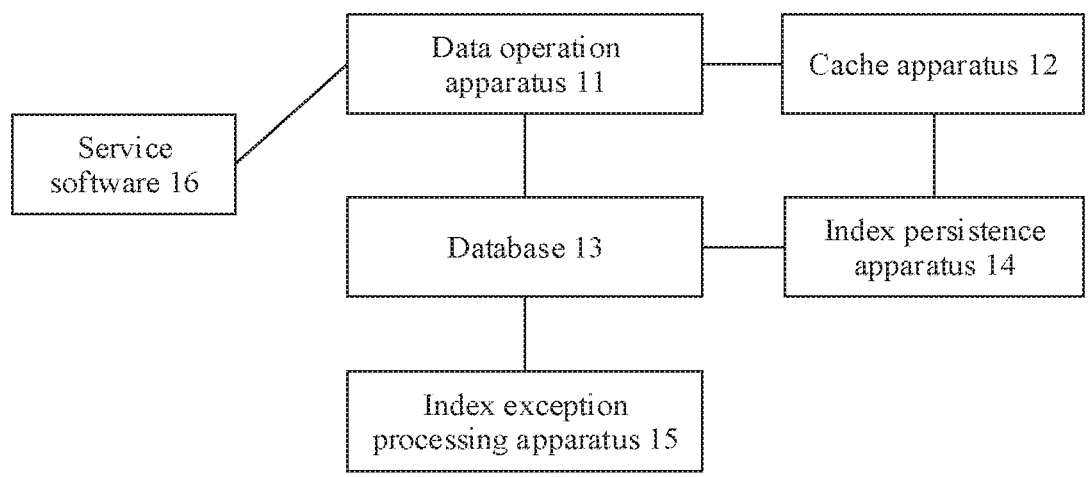
FIG. 1 is a schematic diagram of a possible network architecture according to an embodiment of the present disclosure.

The following describes the technical solutions in the embodiments of the present disclosure with reference to the accompanying drawings in the embodiments of the present disclosure. An operation method in method embodiments may also be applied to an apparatus embodiment or a system embodiment. In the descriptions of this application, unless otherwise specified, "a plurality of" indicates at least two.

Architectures and service scenarios described in the embodiments of the present disclosure are intended to describe the technical solutions of the embodiments of the present disclosure more clearly, and do not constitute any limitation to the technical solutions provided in the embodiments of the present disclosure. A person of ordinary skill in the art may know that, with evolution of a network architecture and emergence of a new service scenario, the technical solutions provided in the embodiments of the present disclosure are also applicable to similar technical problems.

In other approaches, a flat-wide table technology is proposed to implement customization of a data model in a logical multi-tenant scenario, and a data logical model is decoupled from a physical model using three types of tables, namely, a metadata table, a service data table (flat-wide table), and an index table. For example, the metadata table is used to describe the data logical model and describe a field property of a data table. Herein, metadata, also referred to as intermediary data or trunk data, is data about data, is mainly information for describing a data property, and is used to support functions such as indicating a storage location and historical data, searching for a resource, and recording a file. The flat-wide table defines a unified physical model of service data tables and reserves massive fields (for example, 500 fields). All fields are variable length strings. In this way, massive data, with different types, of different tenants can be stored in the flat-wide table. Service data herein may also be referred to as data for short, and is usually data generated by service software and stored in a database. The index table can help a tenant or a user improve performance of querying the flat-wide table for data. The index table may include a unique index, a non-unique index, a relationship index (Relationships), a name index (NameDenom), and a fuzzy index (FallBackIndex). A difference between the unique index and the non-unique index is whether a field value stored in the table is unique. The unique index and the non-unique index may also be referred to as field indexes. The relationship index is mainly used for object association query. The relationship index is used to identify a parent-child relationship between two data records. The name index is used to quickly obtain a name based on an ID. The fuzzy index is used to perform fuzzy search of a word based on a name, and provide a union result. In the embodiments of the present disclosure, the field index and the relationship index are involved.

An example of flat-wide table storage is shown in Table 1. In a same table, different tenants may store service data of different services or service data of different types, and data fields in a same column may be used to store data of different types. For example, a field OrgID in Table 1 may represent different tenant IDs. It can be learned from different values of OrgID in Table 1 that a flat-wide table may store data of different tenants. ObjID is an object type identifier. Generally, data of different object types may be represented using different logical data tables. Therefore, an object table identifier is also an ID of a table. Different objects are classified based on a service requirement. For example, objects are classified into Offerinst and Subscriberinst. A globally unique identifier (GUID) is an identifier of an object instance. Generally, the GUID may be used as a key. For example, an object Offerinst, may have a plurality of object instances, and object instance identifiers of the object instances may be Offerinst01, Offerinst02, Offerinst03 . . . . A field Val0 may represent values of data of different tenants. It may be learned that for different tenants, data types corresponding to Val0 may be different.

TABLE 1

| OrgID | ObjID | GUID    | ... | Val0     |
|-------|-------|---------|-----|----------|
| org1  | a01   | a01 ... 1 | ... | Up       |
| org1  | a01   | a01 ... 2 | ... | Flat     |
| org1  | a02   | a02 ... 1 | ... | 20080129 |
| org1  | a02   | a02 ... 2 | ... | 20080214 |
| org2  | a03   | a03 ... 1 | ... | 41.23    |
| org2  | a03   | a03 ... 2 | ... | −10.3    |

In a current implementation solution of the flat-wide table technology, three types of tables (the metadata table, the service data table, and the index table), namely, nine physical tables including two metadata tables, two service data tables, and five index tables, are usually included. If a data record is stored, related content of the data record is stored in both the service data table and the index table. An object type Offerinst is used as an example. An object type identifier OfferinstID is a primary key. It is assumed that the object type Offerinst has one unique index and two non-unique indexes, and a field SubscriberId is associated with a Subscriber table. In this way, when a data record related to Offerinst is stored, four index records (one unique index record, two non-unique index records, and one relationship index record) all need to be stored. In other words, when one Offerinst record is written, one data record and four index records need to be written in the flat-wide table. A record quantity is five times that in a standard table solution. Assuming that one Subscriber object instance is related to 20 Offerinst object instances, 20 relationship index records need to be obtained when relationships between the Subscriber object instance and the Offerinst object instances are queried for. This brings a severe performance problem to both data storage and query.

FIG. 1 is a schematic diagram of a possible system architecture according to an embodiment of the present disclosure. The architecture includes a data processing apparatus 11, a cache apparatus 12, a database 13, an index persistence apparatus 14, and an exception processing apparatus 15. The database may be configured to: store and manage a flat-wide table, an index table, and a metadata table; provide service of operation such as query, addition, modification, and deletion for the data processing apparatus; handle an index persistence operation of the index persistence apparatus; and handle an exception processing operation in an exception condition. The data processing apparatus may be configured to: handle access of service software 16, define metadata; generate an index; cache an index in the cache apparatus; and access the database to implement operation such as query, addition, modification, and deletion on data stored in the database. The cache apparatus may be configured to cache an index sent by the data processing apparatus, and handle access of the index persistence apparatus. The index persistence apparatus may be configured to: access the cache apparatus, obtain the cached index from the cache apparatus, and save the cached index persistently in the database. The exception processing apparatus may be configured to maintain data consistency of the database when an exception occurs. The following embodiments further describe functions and processing procedures of network elements in a system.

Figure 2:
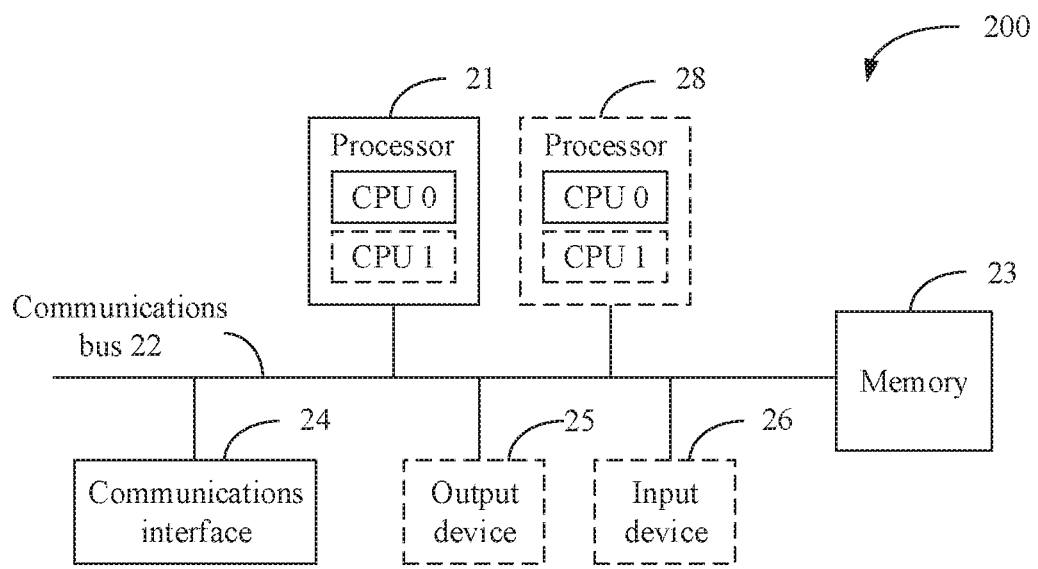
FIG. 2 is a schematic diagram of a computer device according to an embodiment of the present disclosure.

FIG. 2 is a schematic diagram of a computer device according to an embodiment of the present disclosure. The computer device 200 includes at least one processor 21, a communications bus 22, a memory 23, and at least one communications interface 24.

The processor 21 may be a general-purpose central processing unit (CPU), a microprocessor, an application-specific integrated circuit (ASIC), or one or more integrated circuits for controlling program execution in the solutions of the present disclosure.

The communications bus 22 may include a path for transmitting information between the foregoing components. The communications interface 24 is configured to communicate with another device or a communications network such as an Ethernet, a radio access network (RAN), or a wireless local area network (WLAN) using any apparatus such as a transceiver.

The memory 23 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor using a bus. The memory may be integrated with the processor.

The memory 23 is configured to store application program code for executing the solutions of the present disclosure, and the execution is controlled by the processor 21. The processor 21 is configured to execute the application program code stored in the memory 23.

During implementation, in an embodiment, the processor 21 may include one or more CPUs, for example, a CPU 0 and a CPU 1 in FIG. 2.

During implementation, in an embodiment, the computer device 200 may include a plurality of processors, for example, the processor 21 and a processor 28 in FIG. 2. Each of the processors may be a single-core (single-CPU) processor, or may be a multi-core (multi-CPU) processor. The processor herein may be one or more devices, circuits, and/or processing cores configured to process data (for example, a computer program instruction).

During implementation, in an embodiment, the computer device 200 may further include an output device 25 and an input device 26. The output device 25 communicates with the processor 21, and may display information in a plurality of manners. For example, the output device 25 may be a liquid crystal display (LCD), a light-emitting diode (LED) display device, a cathode ray tube (CRT) display device, a projector, or the like. The input device 26 communicates with the processor 21, and may receive user input in a plurality of manners. For example, the input device 26 may be a mouse, a keyboard, a touchscreen device, a sensing device, or the like.

The computer device 200 may be a general-purpose computer device or a dedicated computer device. During implementation, the computer device 200 may be a desktop computer, a portable computer, a network server, a personal digital assistant (PDA), a mobile phone, a tablet computer, a wireless terminal device, a communications device, an embedded device, or a device having a structure similar to that in FIG. 2. A type of the computer device 200 is not limited in this embodiment of the present disclosure.

For example, the data processing apparatus in FIG. 1 may be the device shown in FIG. 2, and a memory of the data processing apparatus stores one or more software modules. The data processing apparatus may implement the software module using a processor and program code in the memory, to implement service processing of the flat-wide table.

Alternatively, the cache apparatus in FIG. 1 may be the device shown in FIG. 2, and a memory of the cache apparatus stores one or more software modules. The cache apparatus may implement the software module using a processor and program code in the memory, to implement service processing of the flat-wide table.

Alternatively, the index persistence apparatus in FIG. 1 may be the device shown in FIG. 2, and a memory of the index persistence apparatus stores one or more software modules. The index persistence apparatus may implement the software module using a processor and program code in the memory, to implement service processing of the flat-wide table.

Alternatively, the exception processing apparatus in FIG. 1 may be the device shown in FIG. 2, and a memory of the exception processing apparatus stores one or more software modules. The exception processing apparatus may implement the software module using a processor and program code in the memory, to implement service processing of the flat-wide table.

Figure 3:
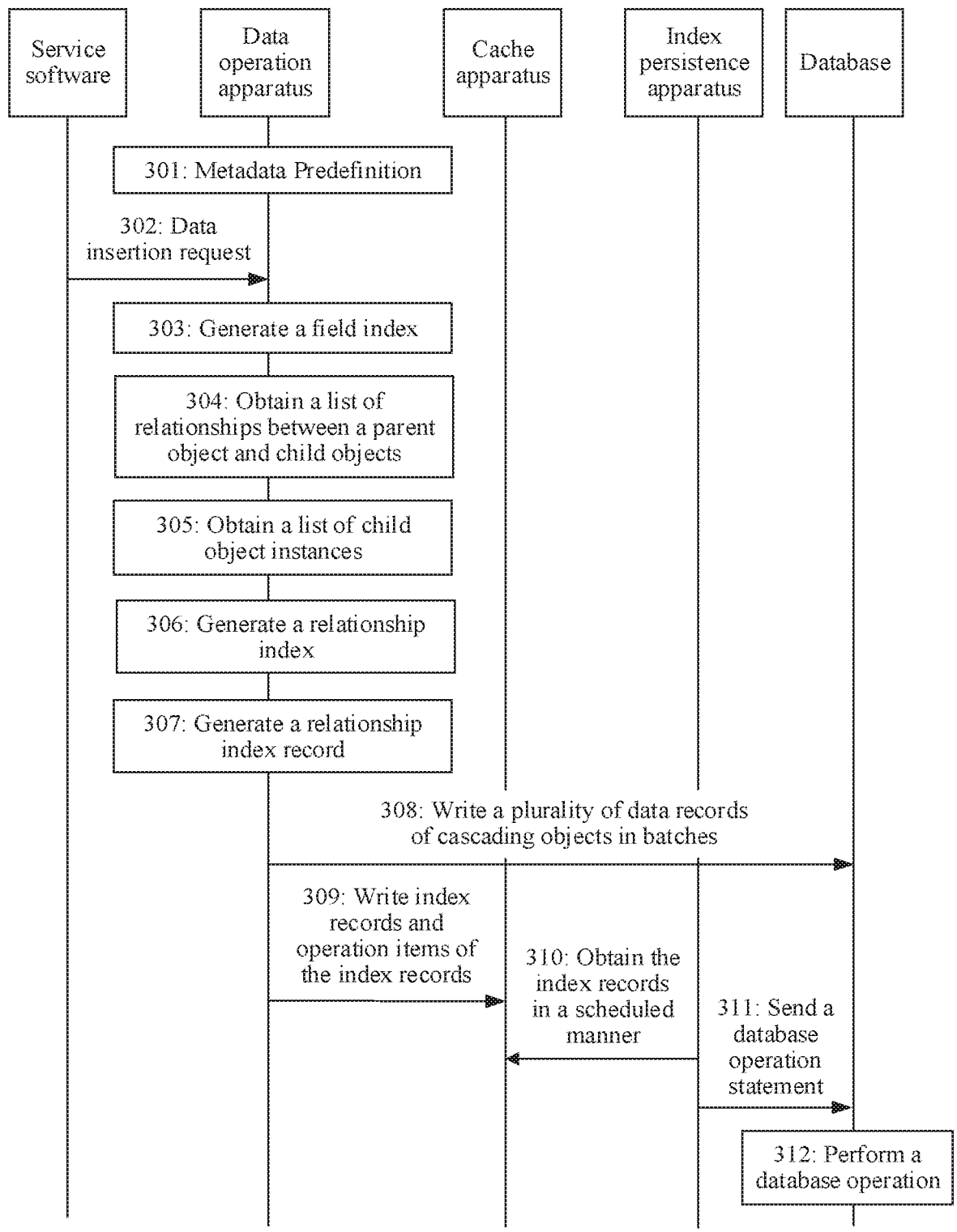
FIG. 3 is a schematic flowchart of a data writing method according to an embodiment of the present disclosure.

FIG. 3 is a schematic flowchart of a data processing method according to an embodiment of the present disclosure. The method may be applied to the network architecture shown in FIG. 1.

Step 301: A data processing apparatus may predefine field metadata and relational metadata, and store the defined field metadata and relational metadata.

The field metadata and the relational metadata are usually stored in the data processing apparatus. Certainly, such metadata may also be stored in a cache apparatus or a database. This is not specifically limited herein. Subsequent steps are described using an example in which the field metadata and the relational metadata are stored in the data processing apparatus. If the field metadata and the relational metadata are stored in the cache apparatus or the database, the field metadata or the relational metadata needs to be obtained from the cache apparatus or the database when the field metadata or the relational metadata is to be used.

The field metadata may be used to generate a unique index and a non-unique index. The field metadata includes an object type identifier, a field identifier, a field type, and an index type. The field identifier is used to uniquely identify a field. The field type may be a common database field type such as a string, a numeric type, or a date type. The index type may be classified into a unique index and a non-unique index. For example, defined field metadata of an object type Offer is shown in Table 2.

TABLE 2

| Object type identifier | Field identifier | Field type | Index type |
|---|---|---|---|
| Offer | OfferInstId | String | Unique index |
| Offer | SubscriberId | String | Non-unique index |
| Offer | OfferId | String | Non-unique index |
| Subscriber | SubscriberId | String | Unique index |
| Subscriber | offerId | String | Non-unique index |

The relational metadata may be used to generate a relationship index. The relational metadata may include a relationship between a parent object and a child object. The relationship between the parent object and the child object may include: an object type identifier of the parent object, an object type identifier of the child object, a relationship type, a field identifier associated with the parent object, and a field identifier associated with the child object. The relationship type may be 1:n, n:1, or the like. For example, defined relational metadata between an object type Subscriber and the object type Offer is shown in Table 3.

TABLE 3

| Object type identifier of a parent object | Object type identifier of a child object | Relationship type | Field identifier associated with the parent object | Field identifier associated with the child object |
|---|---|---|---|---|
| Subscriber | Offer | 1:n | SubscriberId | OfferId |

In this embodiment of the present disclosure, a scenario including cascading objects may exist. To be more specific, there is a mapping relationship between these cascading objects. For example, an object of the object type Subscriber and an object of the object type Offer are cascading objects, where Subscriber is a parent object, Offer is a child object, and there may be a one-to-many relationship between Subscriber and Offer. In such a scenario, if one of the cascading objects writes data to the database, a corresponding relationship index is generated. In addition, Offer may also have a child object. In this case, the parent object Subscriber at the top layer may be referred to as a root object.

Step 302: The data processing apparatus receives a data insertion request sent by service software. Generally, an operation processing objective is to write a data record of the root object to the database. It is assumed that the root object (which is also the parent object) is Subscriber, Offer is a child object of Subscriber, and Offer has 10 child object instances. The data insertion request includes the data record. The data record includes an object type identifier, a field value, a field identifier, and an object instance identifier of an object. The object type identifier is an object type identifier of the parent object (or the root object). The data insertion request may include one or more data records.

The following further describes a plurality of operation processing procedures that may be involved when the data record is inserted. Step 303 describes a field index generation procedure, steps 304 to 307 describe a relationship index generation procedure, and steps 308 to 312 describe a data record writing procedure and an index record writing procedure.

Step 303: The data processing apparatus obtains field metadata based on the object type identifier of the parent object. The data processing apparatus further generates the field index for the parent object based on the field metadata, the field value, and the object instance identifier. If the field value is unique, the generated field index is a unique index. If the field value is non-unique, the generated field index is a non-unique index. The field index may include the object type identifier, the field identifier, the field value, and the object instance identifier. For example, the index is shown in Table 4.

TABLE 4

| Object type identifier | Field identifier | Field value | Object instance identifier |
|---|---|---|---|

Step 304: The data processing apparatus queries for relational metadata based on the object type identifier of the parent object, obtains an association relationship of the parent object, and obtains a list of relationships between the parent object and the child objects.

For example, a source object type identifier is the object type identifier of the parent object Subscriber. A query condition is SourceObjectID='Subscriber'. All association relationships of the parent object Subscriber are returned.

The association relationships may include the list of relationships between the parent object and the child objects (namely Subscriber-Offer).

Step 305: The data processing apparatus traverses the list of the relationships between the parent object and the child objects, for a relationship between each pair of parent object instance and child object instance, obtains an object type identifier of the child object, and obtains a list of all child object instances from the parent object instance based on the object type identifier of the child object.

For example, for the Subscriber-Offer relationship list, there are 10 child object instances Offer. Therefore, there are relationships between 10 pairs of parent object and child object in Subscriber-Offer. The object type identifier Offer of the child object is obtained, and an operation of obtaining all the child object instances of the parent object instance is performed based on the parent object instance. In this way, a list of 10 child object instances whose object type is Offer is obtained.

Step 306: The data processing apparatus traverses the list of child object instances based on the obtained list of the child object instances, and generates a relationship index for each pair of parent object instance and child object instance. Table 5 is an example of two relationship indexes.

TABLE 5

| Parent object type identifier | Parent object instance identifier | Child object type identifier | Child object instance identifier |
|---|---|---|---|
| Subscriber | 111111 | Offer | 200001 |
| Subscriber | 111111 | Offer | 200002 |

Each child object instance is processed based on the foregoing process until a relationship index of each pair of parent object and child object is generated.

Step 307: The data processing apparatus generates a final relationship index record based on all relationship indexes of the root object, where the final relationship index record includes a root object type identifier, a root object instance identifier, and relational data. The following uses Table 6 as an example to describe the relationship index record.

TABLE 6

| Parent object type identifier | Parent object instance identifier | Relational data |
| --- | --- | --- |
| Subscriber | 111111 | (Subscriber, 111111, Offer, 200001), (Subscriber, 111111, Offer, 200002) |

Next, the following further provides descriptions that the data processing apparatus starts the first transaction, writes a data record to the database, and writes an index record to the cache apparatus.

Step 308: The data processing apparatus writes a plurality of data records of cascading objects to the database in batches, where writing the data records to the database may be understood as inserting the data records into a data table of the database. For example, as shown in Table 6, a record in which an object type identifier is Subscriber and an object instance identifier is 11111, and a data record in which an object type identifier is Offer and an object instance identifier is 20001 are written.

TABLE 7

| Object type identifier | Object instance identifier | Value 0 | Value 1 . . . |
| --- | --- | --- | --- |
| Subscriber | 111111 | | |
| Offer | 200001 | | |

Step 309: The data processing apparatus writes the index record such as the field index and the relationship index that are generated in the foregoing steps and an operation for the index record to the cache apparatus, where the operation may include insertion (insert), deletion (delete), update, and the like, and writes the index record and the operation for the index record to the cache apparatus in chronological order of the operation.

A relationship index record cached in the cache apparatus may be shown in Table 8. Herein, because an object is newly added, an operation is insertion.

TABLE 8

| Root object type identifier | Root object instance identifier | Relational data | Operation | Date |
| --- | --- | --- | --- | --- |
| Subscriber | 111111 | (Subscriber, 111111, Offer, 200001), (Subscriber, 111111, Offer, 200002) | Insert | 2017 Dec. 1 |

A field index record cached in the cache apparatus may be shown in Table 9. Herein, because an object is newly added, an operation is insertion.

TABLE 9

| Object type identifier | Field identifier | Field value | Object instance identifier | Operation | Date |
| --- | --- | --- | --- | --- | --- |
| Subscriber | SubscriberId | zhangsan | 111111 | insert | 2017 Dec. 1 |

After the data processing apparatus writes the data record to the database and writes the index record into the cache apparatus, the first transaction ends.

An index persistence apparatus starts a scheduled task, starts the second transaction when a predetermined time arrives, and writes the index record in the cache apparatus to the database. The following describes a process in which the index persistence apparatus writes the index record in the cache apparatus to the database.

Step 310: The index persistence apparatus scans, in a scheduled manner, a to-be-updated index record cached in the cache apparatus, and obtains the index record in chronological order.

Step 311: The index persistence apparatus obtains the operation from the index record, and generates a database operation statement based on the index record, and the index persistence apparatus sends the database operation statement to the database. For example, a database operation statement is an SQL statement. If an operation type is insertion, an insert SQL statement is generated; if an operation type is deletion, a delete SQL statement is generated; or if an operation type is update, an update SQL statement is generated. An example is provided: an example of an SQL statement for inserting a relationship index record is: insert into relationship ('Subscriber', '111111', '( . . . ), ( . . . )').

Step 312: The database receives the database operation statement from the index persistence apparatus, and performs related database operation processing, such that a database operation on the index record is implemented.

A data record of a flat-wide table is written in two phases. In the first phase, the data record is inserted into the database, and an index record is cached into the cache apparatus. In the second phase, a scheduled task is used to synchronize the index record from the cache apparatus to the database in batches and in a scheduled manner. In this way, high-performance writing of a flat-wide table to the database is implemented. In addition, in an existing solution, a relationship record is generated provided that there is relationship between two objects, resulting in a large quantity of relationship records. In this embodiment of the present disclosure, relationship records are combined, and only one relationship record of the root object is reserved, such that performance of adding, querying for, or deleting a relationship index is improved.

Figure 4A:
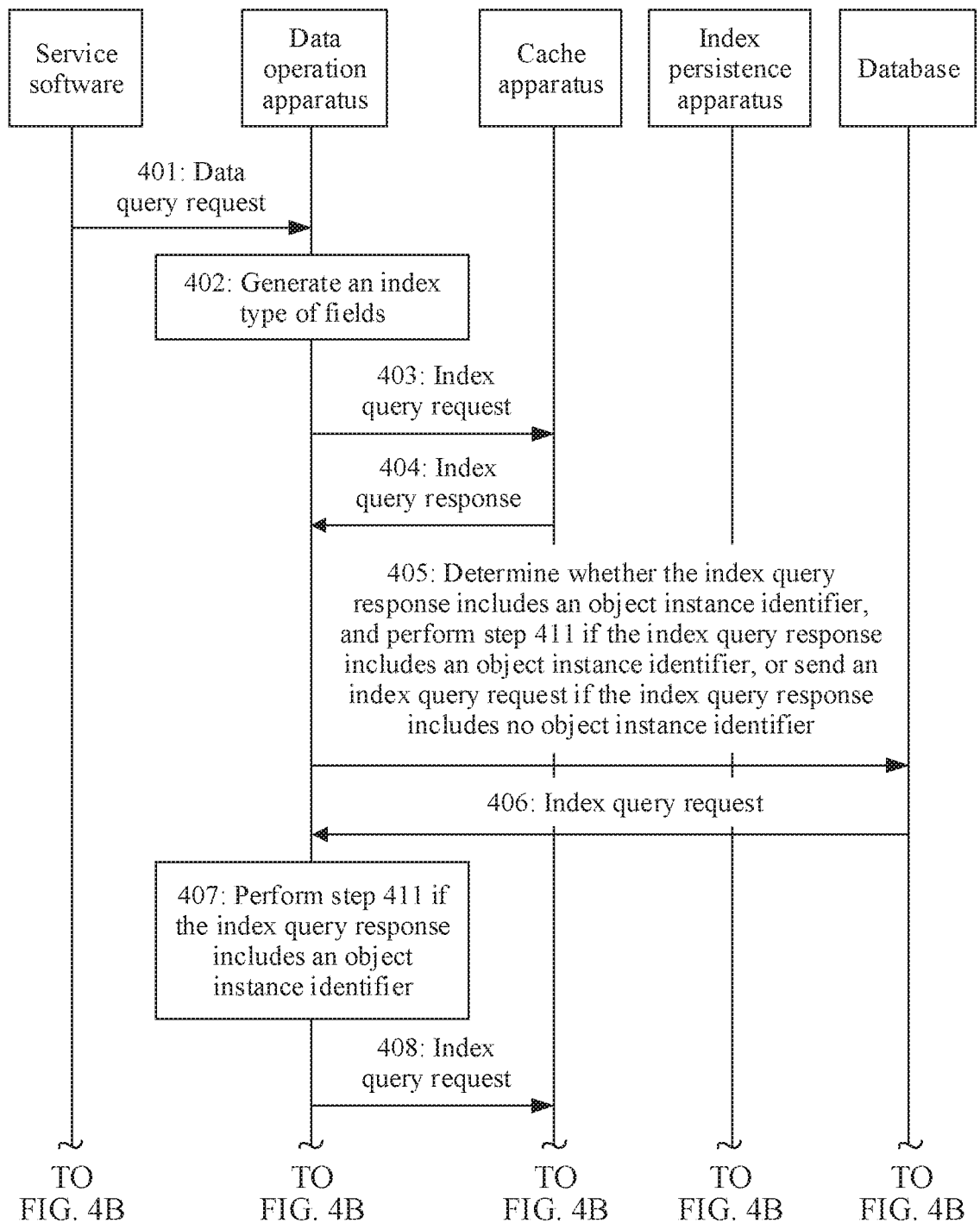
FIG. 4A and FIG. 4B are schematic flowcharts of a cascading object query method according to an embodiment of the present disclosure.
Figure 4B:
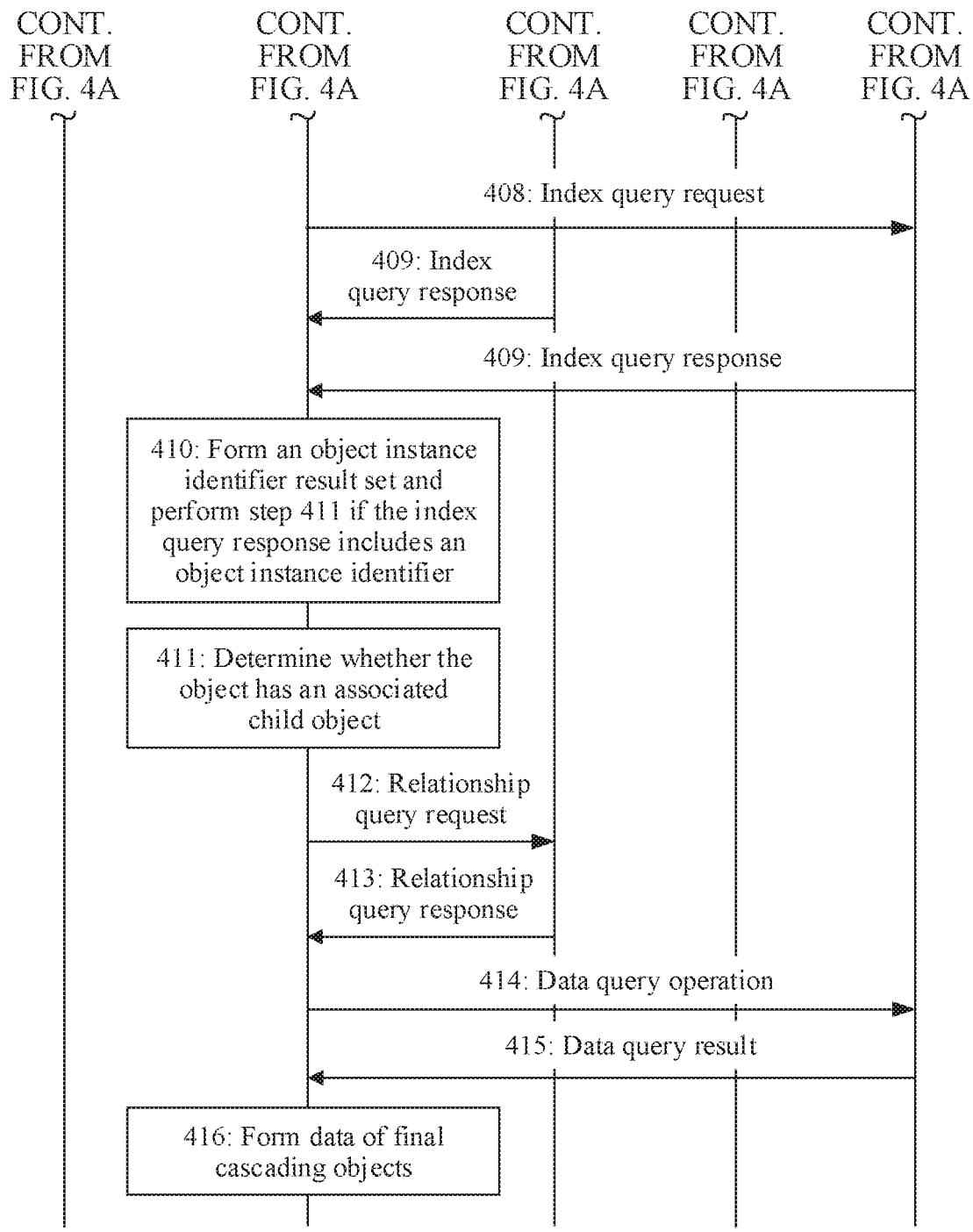
Figure 5A:
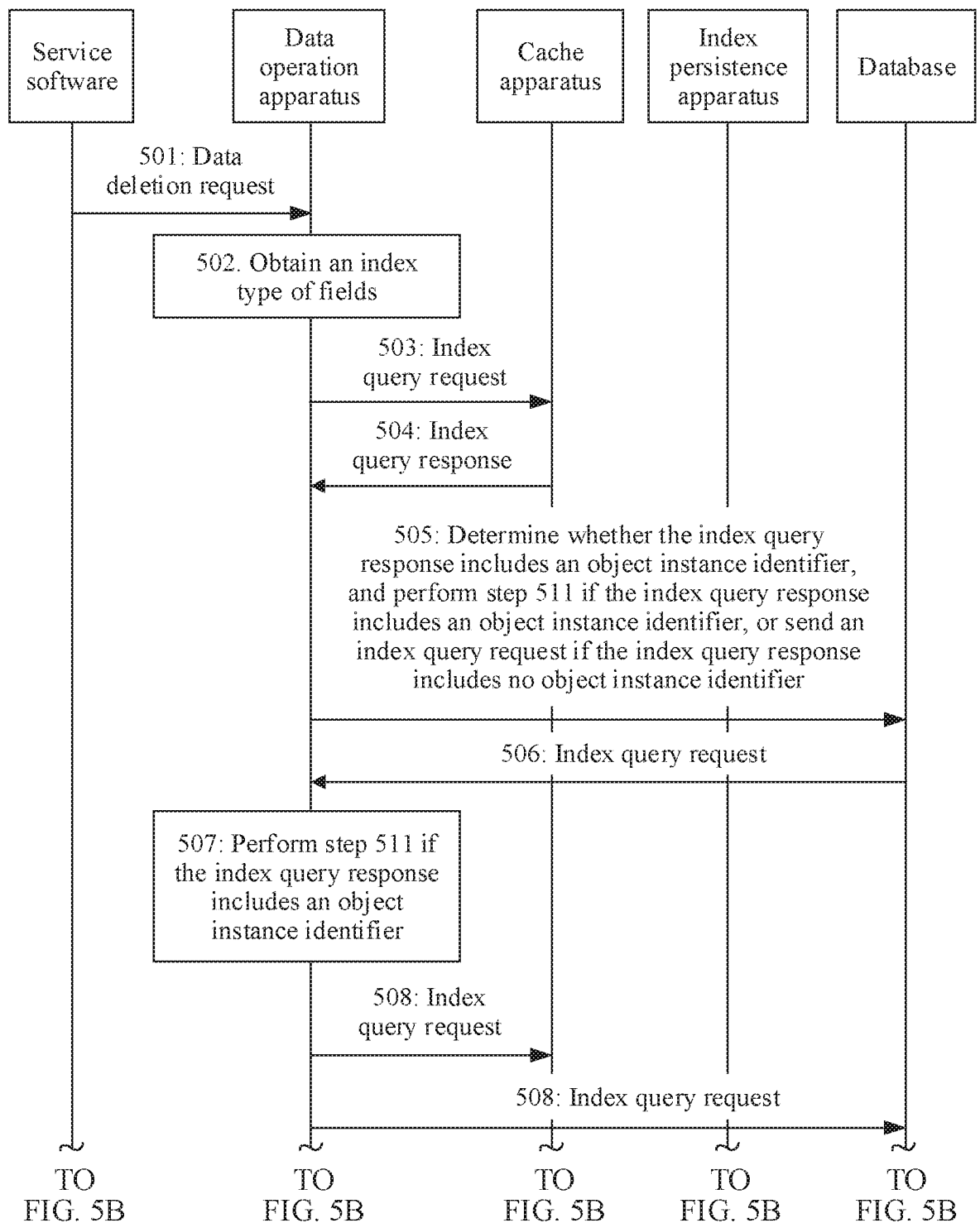
FIG. 5A and FIG. 5B are schematic flowcharts of a cascading object deletion method according to an embodiment of the present disclosure.
Figure 5B:
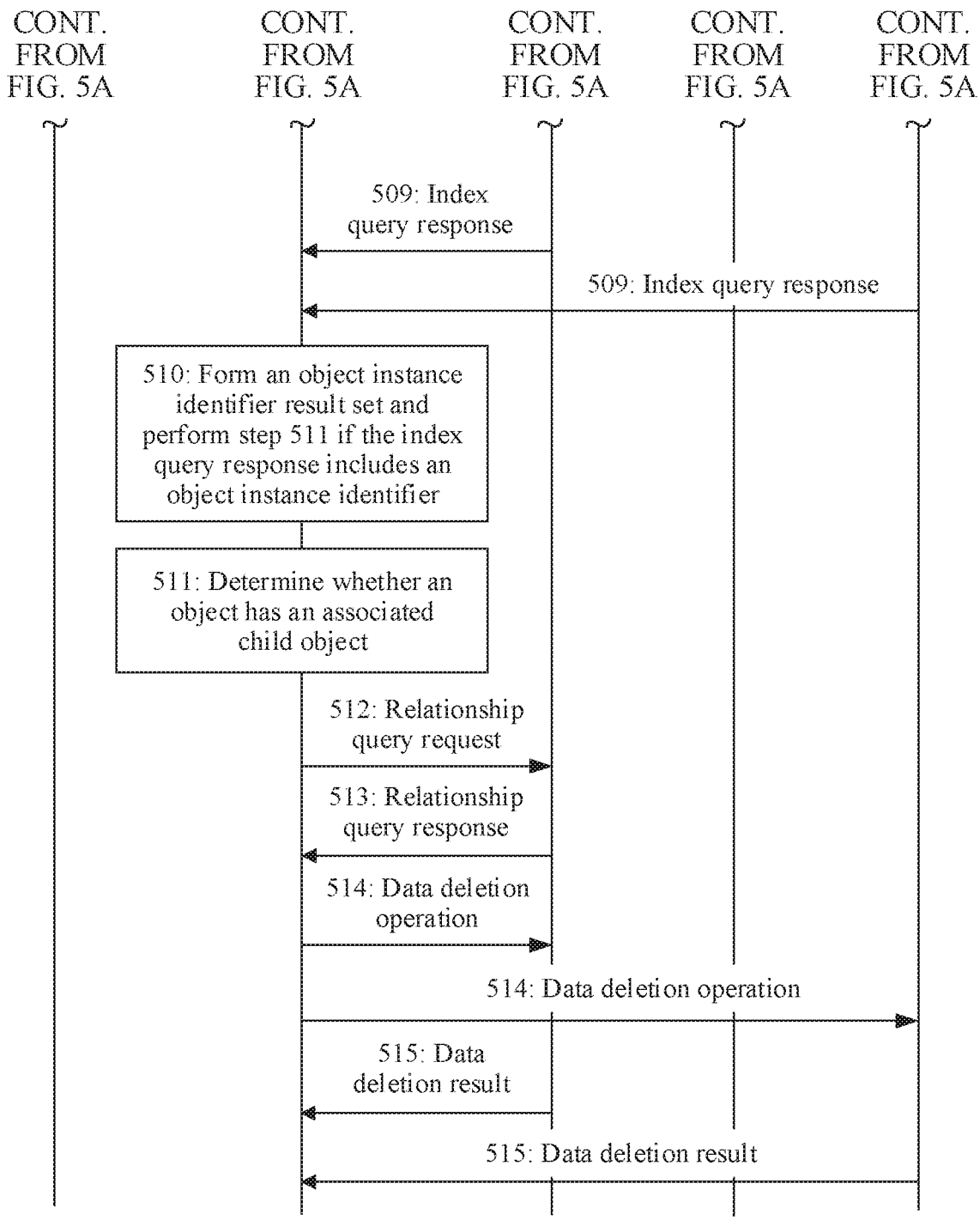
Figure 6:
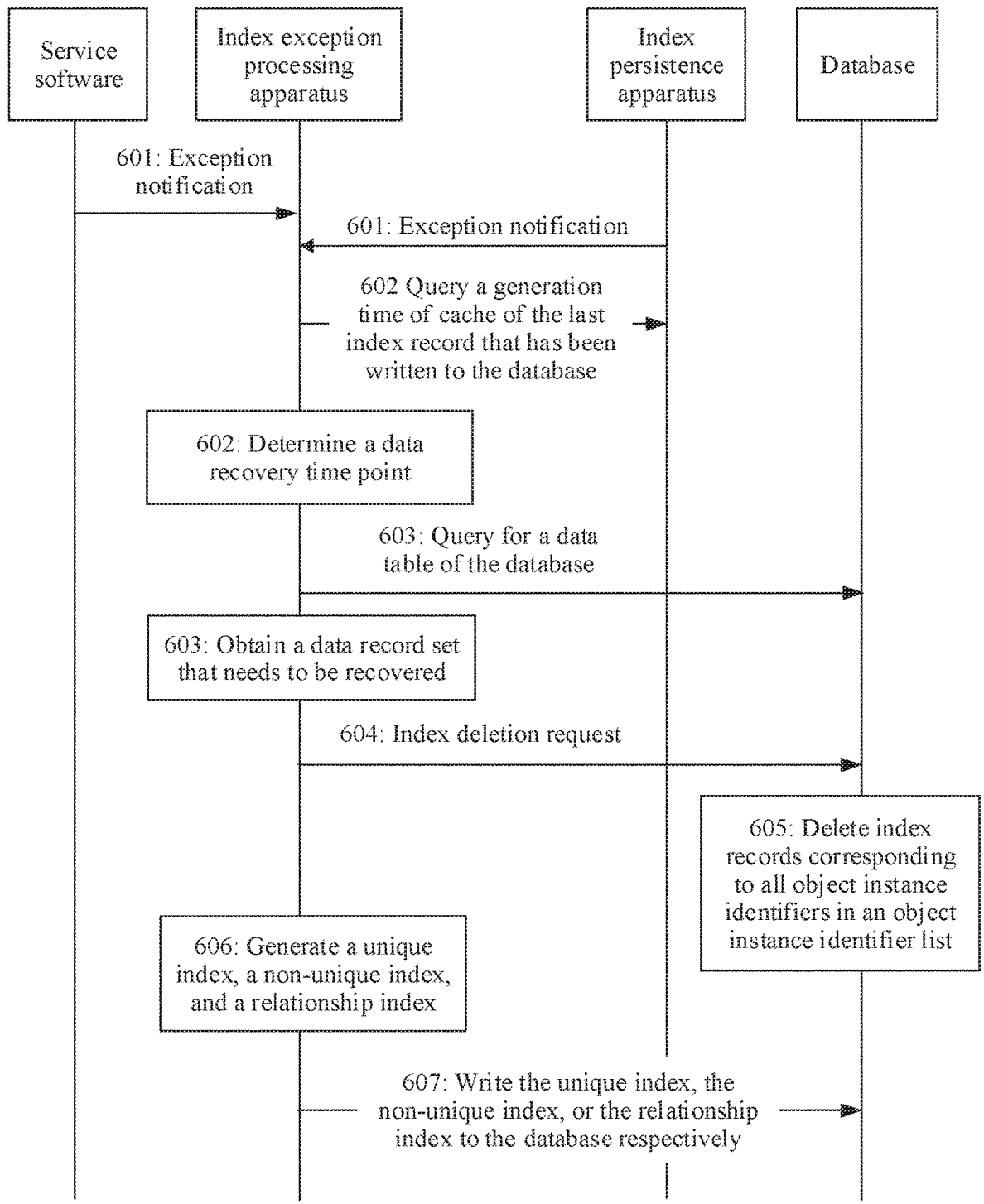
FIG. 6 is a schematic flowchart of a data recovery method according to an embodiment of the present disclosure.

The following further describes a procedure of querying cascading objects with reference to FIG. 4A and FIG. 4B.

Step 401: A data processing apparatus receives a data query request for cascading objects that is sent by service software, and executes a query operation, where a query condition included in the data query request is a root object type identifier and a field identifier. For example, the data query request includes the following SQL statement: select * from Subscriber where SubscriberId='xxx', where a root object herein is Subscriber. Herein, a root object Subscriber and a child object Offer associated with the root object may be queried for based on the SQL statement. The following continues to describe a more detailed query process.

Step 402: The data processing apparatus queries for field metadata based on the object type identifier and the field identifier, and obtains an index type of a field. For example, the field metadata is queried for using the object type identifier Subscriber and the field identifier SubscriberId, and the index type of the field is determined. The data processing apparatus generates an index query request, where the index query request includes the object type identifier, the field identifier, and the field value. It is assumed that the field value herein is SubscriberID=xxx. If the index type is a unique index, step 403 is performed. If the index type is a non-unique index, step 408 is performed.

Step 403: The data processing apparatus sends the index query request to a cache apparatus.

Step 404: The cache apparatus receives the index query request sent by the data processing apparatus, queries for a cached index record based on the object type identifier, the field identifier, and the field value, and returns an index query response.

If the cached index record includes the field value, the index query response returned by the cache apparatus to the data processing apparatus includes an object instance identifier corresponding to the field value. If the cached index record does not include the field, the index query response returned by the cache apparatus to the data processing apparatus does not include an object instance identifier corresponding to the field value. For example, the index query response may be empty, or the index query response includes an indication, an identifier, or the like indicating that the field value cannot be found.

Step 405: The data processing apparatus receives the index query response sent by the cache apparatus, and the data processing apparatus determines whether the index query response includes an object instance identifier. If the index query response includes an object instance identifier, step 411 is performed. Alternatively, if the index query response includes no object instance identifier, the data processing apparatus sends an index query request to a database.

Step 406: The database receives the index query request, queries for a stored index record based on the field value, and returns an index query response to the data processing apparatus.

Step 407: The data processing apparatus receives the index query response sent by the database, and the data processing apparatus determines whether the index query response includes an object instance identifier. If the index query response includes an object instance identifier, step 411 is performed. Alternatively, if the index query response includes no object instance identifier, the data processing apparatus determines that the query fails.

Step 408: The data processing apparatus sends an index query request to both a cache apparatus and a database.

Step 409: The cache apparatus and the database separately receive the index query request. The cache apparatus queries for a cached index record based on the object type identifier, the field identifier, and the field value, and returns an index query response to the data processing apparatus. The database queries for a stored index record based on the object type identifier, the field identifier, and the field value, and returns an index query response to the data processing apparatus. Content that may be included in the index query response is the same as content that may be included in the index query response described in step 404.

Step 410: The data processing apparatus separately receives the index query responses sent by the cache apparatus and the database, and the data processing apparatus determines whether the index query response includes an object instance identifier. If the index query response includes an object instance identifier, the object instance identifier included in the index query response is obtained, where a plurality of object instance identifier results form an object instance identifier set, and the result set includes the plurality of object instance identifiers, and step 411 is performed. If the index query response includes no object instance identifier, the query fails.

Step 411: The data processing apparatus queries for relational metadata based on the object instance identifier or the object instance identifiers included in the object instance identifier set, and determines whether the parent object has an associated child object. If the data processing apparatus determines that the parent object has an associated child object, step 412 is performed. If the parent object has no associated child object, step 414 is performed.

Step 412: The data processing apparatus sends a relationship query request to the cache apparatus to query for relational data, where the relationship query request includes an object type identifier of the root object and an object instance identifier of the root object.

Step 413: The data processing apparatus receives a relationship query response sent by the cache apparatus. When the relationship query response includes relational data, the data processing apparatus obtains the relational data. When the relationship query response includes no relational data, the data processing apparatus sends a relationship query request to the database to query relational data, receives a relationship query response sent by the database, and obtains the relational data.

Step 414: The data processing apparatus obtains object instance identifiers of all related child objects based on the relational data, to form an object instance identifier list, and performs a data query operation on the database based on the object instance identifier list, for example, sends an SQL query statement to the database. For example, the SQL query statement may be: Select * from data_table where guid in ('111111', '200001', '200002' . . . ).

Step 415: The database handles the data query operation of the data processing apparatus to obtain a data record set of an object, and returns a data query result to the database, where the data query result includes the data record set of the object.

Step 416: The data processing apparatus receives the data query result, and converts a data record into an object based on each data record and an object instance identifier of the data record. Additionally, the data processing apparatus sets a relationship between the objects based on a relationship index in the relational data, to form final a data record of a cascading object.

The following further describes a procedure of deleting cascading objects.

Step 501: A data processing apparatus executes a deletion operation request for cascading objects that is initiated by service software, where the deletion operation request includes an object type identifier and a field identifier of a root object. For example, to delete Subscriber and an associated object Offerinst of Subscriber, a deletion condition is SubscriberId='xxx'.

Steps 502 to 513 are the same as steps 402 to 413 in the query process.

Step 514: The data processing apparatus obtains object instance identifiers of all related child objects based on the relational data to form an object instance identifier list, generates a data deletion request based on the object instance identifier list, and sends the data deletion request to both the database and the cache apparatus. For example, an SQL statement of the data deletion request may be:

delete * from data_table where guid in ('111111', '200001', '200002' . . . ).

Step 515: The cache apparatus and the database separately handle a data deletion operation, deletes corresponding data, a relationship index, and a field index, and returns a deletion result to the data processing apparatus.

The following further describes index record recovery when a cache exception occurs.

Step 601: When an exception occurs during accessing a cache apparatus by service software or an index persistence apparatus, the service software or the index persistence apparatus sends an exception notification to an index exception processing apparatus.

Step 602: After receiving the exception notification, the index exception processing apparatus queries the index persistence apparatus for a generation time of cache of the last index record written to a database. Additionally, the index exception processing apparatus determines a data recovery time point based on the generation time, where the data recovery time point may be the generation time minus a time interval (for example, 1 minute).

Step 603: The index exception processing apparatus queries a data table of a database using the data recovery time point, and obtains a data record set that needs to be recovered, where the data record set that needs to be recovered is a data record stored after the data recovery time point.

Step 604: The index exception processing apparatus obtains an object instance identifier list from the data record set, and sends an index deletion request to the database, where the index deletion request includes the object instance identifier list.

Step 605: The database receives the index deletion request, and deletes index records corresponding to all object instance identifiers in the object instance identifier list.

Step 606: The index exception processing apparatus obtains field metadata and relational metadata of each object instance, and generates, based on the field metadata, a field index for each data record that has no deletion marker. The index exception processing apparatus also generates a relationship index for a data record of a cascading object based on the relational metadata.

Step 607: The index exception processing apparatus respectively writes a unique index, a non-unique index, or the relationship index to a unique index table, a non-unique index table, or a relationship index table in the database.

According to the method provided in this embodiment, data recovery and index recovery when an index exception occurs can be implemented, and data consistency of the database is ensured.

In the embodiments shown in FIG. 3 to FIG. 6, the actions of the data processing apparatus may be performed by the data processing apparatus based on the software module in the memory mentioned above. The actions of the cache apparatus may be performed by the cache apparatus based on the software module in the memory mentioned above. The actions of the index persistence apparatus may be performed by the index persistence apparatus based on the software module in the memory mentioned above. The actions of the index exception processing apparatus may be performed by the index exception processing apparatus based on the software module in the memory mentioned above. This is not limited in the embodiments of this application.

The foregoing mainly describes the solutions provided in the embodiments of the present disclosure from a perspective of interaction between network elements. It may be understood that, to implement the foregoing functions, the foregoing device that implements data processing includes corresponding hardware structures and/or software modules for performing the functions. A person of ordinary skill in the art should be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, the data processing apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of the present disclosure, division into the modules is an example, and is merely logical function division. During actual implementation, another division manner may be used.

Figure 7:
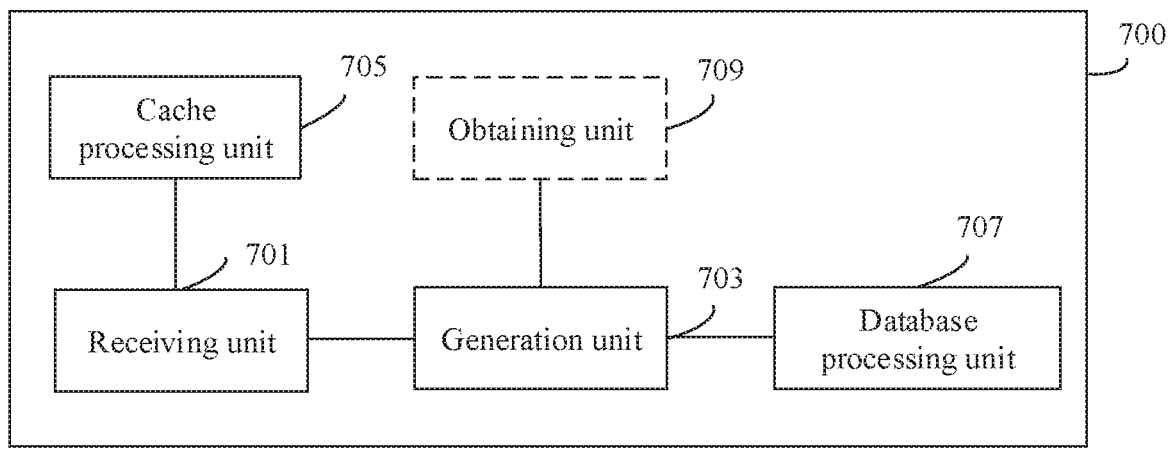
FIG. 7 is a schematic structural diagram of an apparatus for implementing data processing according to an embodiment of the present disclosure.

For example, when each function module is obtained through division based on each corresponding function, FIG. 7 is a possible schematic structural diagram of an apparatus for implementing data processing in the foregoing embodiments. The apparatus 700 includes a receiving unit 701, a generation unit 703, a database processing unit 707, and a cache processing unit 705.

The receiving unit 701 is configured to receive a data insertion request sent by service software, where the data insertion request includes a data record, and the data record includes an object type identifier, a field value, a field identifier, and an object instance identifier.

The generation unit 703 is configured to generate a field index based on the object type identifier, the field value, and the object instance identifier.

The generation unit 703 is further configured to generate a relationship index based on the object type identifier.

The database processing unit 707 is configured to write the data record to a database.

The cache processing unit 705 is configured to cache an index record and an operation for the index record into a cache apparatus, where the index record includes the relationship index and the field index.

In a possible implementation, the generation unit 703 is configured to obtain field metadata based on the object type identifier, and generate the field index based on the field metadata, the field value, and the object instance identifier, where the field index includes a unique index or a non-unique index.

In another possible implementation, the generation unit 703 is configured to: obtain relational metadata based on the object type identifier, where the relational metadata includes a relationship between a parent object and a child object, and the relationship between the parent object and the child object includes an object type identifier of the parent object, an object type identifier of the child object, a field identifier associated with the parent object, and a field identifier associated with the child object; obtain the relationship between the parent object and the child object and the object type identifier of the child object from the relational metadata; obtain a list of all child object instances from a parent object instance based on the object type identifier of the child object; traverse the list of child object instances and generate a relationship index for each pair of parent object instance and child object instance; and generate a relationship index record based on all relationship indexes of the parent object, where the relationship index record includes a parent object type identifier, a parent object instance identifier, and all the relationship indexes of the parent object.

In another possible implementation, the cache processing unit 705 is configured to separately cache the index record and the operation for the index record into the cache apparatus in chronological order of the operation for the index record.

In another possible implementation, the receiving unit 701 is further configured to receive a data operation request sent by the service software, where the data operation request includes the object type identifier, the field value, and the field identifier. The apparatus further includes an obtaining unit 709 configured to: obtain relational data based on the object type identifier and the field identifier, where the relational data includes object instance identifiers of all child objects associated with a parent object; and obtain an object instance identifier list based on the relational data, where the object instance identifier list includes the object instance identifiers of all the child objects associated with the parent object in the relational data. The database processing unit 707 is further configured to perform a data operation on the database based on the object instance identifier list.

In another possible implementation, the obtaining unit 709 is configured to: query for field metadata based on the object type identifier and the field identifier; determine that the field index is a unique index or a non-unique index; generate an index query request, where the index query request includes the object type identifier, the field identifier, and the field value; send the index query request to the cache apparatus when the field index is a unique index; receive a first index query response returned by the cache apparatus; determine whether the first index query response includes the object instance identifier; and obtain the relational data if the first index query response includes the object instance identifier. The obtaining unit 709 is further configured to: send the index query request to the database if the first index query response does not include the object instance identifier; receive a second index query response sent by the database; and obtain the relationship data if determining that the second index query response includes the object instance identifier. The obtaining unit 709 is further configured to: send the index query request to both the cache apparatus and the database when the field index is a non-unique index; separately receive a third index query response sent by the cache apparatus and a fourth index query response sent by the database; separately obtain an object instance identifier included in the third index query response and an object instance identifier included in the fourth index query response; form an object instance identifier set, where the object instance identifier set includes the object instance identifier included in the third index query response and the object instance identifier included in the fourth index query response; and obtain the relational data.

In another possible implementation, the obtaining unit 709 is further configured to: query for relational metadata based on the object instance identifier or the object instance identifiers included in the object instance identifier set; determine that an object corresponding to the object instance identifier includes an associated child object, send a relationship query request to the cache apparatus to query for relational data; and receive a first relationship query response sent by the cache apparatus. When the first relationship query response includes relational data, the obtaining unit 709 is configured to obtain the relationship data. Alternatively, the obtaining unit 709 is configured to: send, when the first relationship query response includes no relational data, a relationship query request to the database to query for relational data; receive a second relationship query response sent by the database; and obtain the relational data from the second relationship query response.

In another possible implementation, the database processing unit 707 is further configured to obtain, when the data operation request is a data query request, a data record set of all object instances in the object instance identifier list from the database based on the object instance identifier list.

In another possible implementation, the database processing unit 707 is further configured to separately delete, based on the object instance identifier list when the data operation request is a data deletion request, index records that are of all object instances in the object instance identifier list and that are in the database and the cache apparatus.

All related content of the steps in the foregoing method embodiments may be cited in function descriptions of corresponding function modules. Details are not described herein again.

In this embodiment, the apparatus for implementing data processing is presented by obtaining each function module through division based on each corresponding function, or the apparatus for implementing data processing is presented by obtaining each function module through division in an integrated manner. The "module" herein may be an application-specific integrated circuit (ASIC), a circuit, a processor and a memory for executing one or more software or firmware programs, an integrated logic circuit, and/or another device that can provide the foregoing function. In an embodiment, a person skilled in the art may conceive that the apparatus 700 for implementing data processing may be in a form shown in FIG. 2. For example, the receiving unit 701, the generation unit 703, the cache processing unit 705, and the database processing unit 707 or the obtaining unit 709 in FIG. 7 may be implemented using the processor 21 (and/or the processor 28) and the memory 23 in FIG. 2. Further, the receiving unit 701, the generation unit 703, the cache processing unit 705, and the data processing unit 707 or the obtaining unit 709 may be implemented by the processor 21 (and/or the processor 28) by invoking and executing the application program code stored in the memory 23. This is not limited in this embodiment of the present disclosure.

Figure 8:
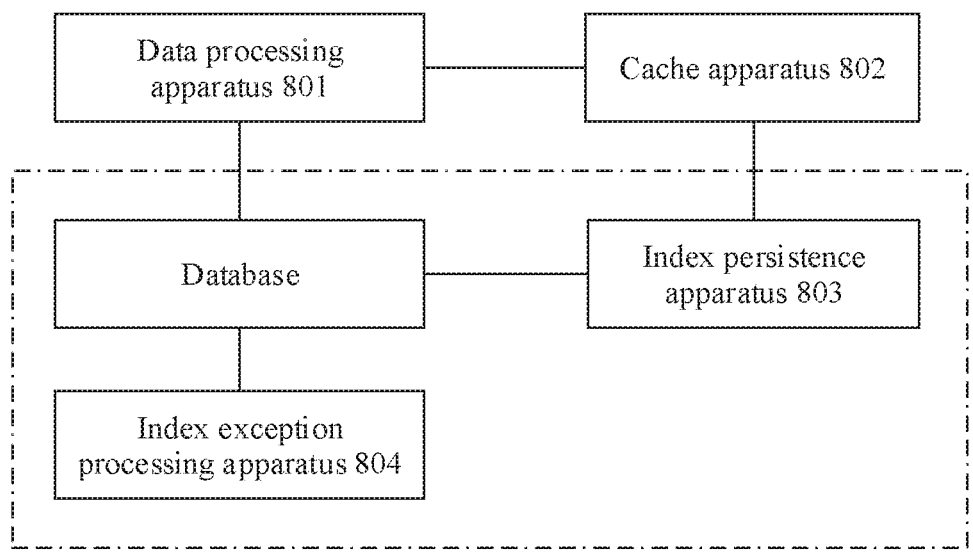
FIG. 8 is a schematic diagram of a system for implementing data processing according to an embodiment of the present disclosure.

FIG. 8 shows a data processing system in the foregoing embodiments. The system includes a data processing apparatus 801 and a cache apparatus 802.

The data processing apparatus 801 is configured to: receive a data insertion request sent by service software, where the data insertion request includes a data record, and the data record includes an object type identifier, a field value, a field identifier, and an object instance identifier; generate a field index based on the object type identifier, the field value, and the object instance identifier; generate a relationship index based on the object type identifier; write the data record to a database; and cache an index record and an operation for the index record into the cache apparatus, where the index record includes the relationship index and the field index.

The cache apparatus 802 is configured to cache the index record and the operation for the index record.

In an implementation, the system further includes an index persistence apparatus 803 configured to write the index record and the operation for the index record in the cache apparatus to the database when a predetermined time arrives.

In an implementation, the index persistence apparatus 803 is configured to: obtain, in chronological order of operation, the index record and the operation for the index record that are stored in the cache apparatus; and generate a database operation statement based on the index record and the operation for the index record, and send the database operation statement to the database.

In an implementation, the system further includes an index exception processing apparatus 804 configured to: query, after receiving an exception notification, the index persistence apparatus for a generation time of cache of the last index record written to the database; determine a data recovery time point based on the generation time; query a data table of the database based on the data recovery time point; obtain a data record set that needs to be recovered, where the data record set that needs to be recovered is a data record stored after the data recovery time point; obtain an object instance identifier list from the data record set; send an index deletion request to the database, where the index deletion request includes the object instance identifier list; obtain field metadata and relational metadata of each object instance based on the object instance identifier list; generate, based on the field metadata, a field index for each data record that has no deletion marker; generate a relationship index based on the relational metadata; and separately write the field index and the relationship index to the database.

All related content of the steps in the foregoing method embodiments may be cited in the devices in the system, and details are not described herein again.

An embodiment of the present disclosure further provides a computer storage medium, configured to store a computer software instruction used by the apparatus for implementing data processing shown in FIG. 3 to FIG. 6. The computer software instruction includes program code designed for executing the method embodiments. By executing the stored program code, performance of processing data in a flat-wide table can be improved.

An embodiment of the present disclosure further provides a computer program product. The computer program product includes a computer software instruction, and the computer software instruction may be loaded using a processor, to implement the methods in the foregoing method embodiments.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with another hardware, or may also use another distribution form, such as using the Internet or another wired or wireless telecommunications system.

This application is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

Although the present disclosure is described with reference to example features and the embodiments thereof, various modifications and combinations may be made to them without departing from the spirit and scope of the present disclosure. Correspondingly, the specification and accompanying drawings are merely exemplary description of the present disclosure defined by the accompanying claims, and is considered as any of or all modifications, variations, combinations or equivalents that cover the scope of the present disclosure. A person skilled in the art can make various modifications and variations to the present disclosure without departing from the spirit and scope of the present disclosure. The present disclosure is intended to cover these modifications and variations provided that they fall within the scope of the claims of the present disclosure and their equivalent technologies.

What is claimed is:

1. A data processing method, comprising:
receiving a data insertion request from service software, wherein the data insertion request comprises a data record, and wherein the data record comprises an object type identifier, a field value, a field identifier, and an object instance identifier;
generating a field index based on the object type identifier, the field value, the field identifier, and the object instance identifier;
generating a relationship index based on the object type identifier;

writing the data record to a database; and caching an index record and an operation for the index record into a cache apparatus in chronological order of the operation for the index record, wherein the index record comprises the relationship index and the field index.

2. The data processing method of claim 1, wherein generating the field index comprises:

obtaining field metadata based on the object type identifier; and generating the field index further based on the field metadata, wherein the field index comprises a unique index or a non-unique index.

3. The data processing method of claim 1, wherein generating the relationship index based on the object type identifier comprises:

obtaining relational metadata based on the object type identifier, wherein the relational metadata comprises a relationship between a parent object and a child object, and wherein the relationship comprises an object type identifier of the parent object, an object type identifier of the child object, a field identifier associated with the parent object, and a field identifier associated with the child object;

obtaining, from the relational metadata, the relationship and the object type identifier of the child object;

obtaining a list of all child object instances from a parent object instance based on the object type identifier of the child object;

traversing the list of all child object instances;

generating a relationship index for each pair of parent object instance and child object instance; and generating a relationship index record based on all relationship indexes of the parent object, wherein the relationship index record comprises the object type identifier of the parent object, a parent object instance identifier, and all the relationship indexes of the parent object.

4. The data processing method of claim 1, further comprising:

receiving a data operation request from the service software, wherein the data operation request comprises the object type identifier, the field value, and the field identifier;

obtaining relational data based on the object type identifier, the field value, and the field identifier, wherein the relational data comprises object instance identifiers of all child objects associated with a parent object;

obtaining an object instance identifier list based on the relational data, wherein the object instance identifier list comprises the object instance identifiers of all the child objects associated with the parent object in the relational data; and performing a data operation on the database based on the object instance identifier list.

5. The data processing method of claim 4, wherein obtaining the relational data comprises:

querying for field metadata based on the object type identifier and the field identifier;

determining that the field index is a unique index or a non-unique index;

generating an index query request, wherein the index query request comprises the object type identifier, the field identifier, and the field value; and when the field index is the unique index:

sending the index query request to the cache apparatus;

receiving a first index query response from the cache apparatus;

determining whether the first index query response comprises the object instance identifier; and if the first index query response comprises the object instance identifier, obtaining the relational data; or if the first index query response does not comprise the object instance identifier:

sending the index query request to the database;

receiving a second index query response from the database; and obtaining the relational data when determining that the second index query response comprises the object instance identifier; or when the field index is the non-unique index:

sending the index query request to both the cache apparatus and the database;

separately receiving a third index query response from the cache apparatus and a fourth index query response from the database;

separately obtaining an object instance identifier in the third index query response and an object instance identifier in the fourth index query response;

forming an object instance identifier set, wherein the object instance identifier set comprises the object instance identifier in the third index query response and the object instance identifier in the fourth index query response; and obtaining the relational data.

6. The data processing method of claim 5, wherein obtaining the relational data further comprises:

querying for relational metadata based on the object instance identifier or the object instance identifiers in the object instance identifier set;

determining that an object corresponding to the object instance identifier comprises an associated child object;

sending a relationship query request to the cache apparatus to query for relational data;

receiving a first relationship query response from the cache apparatus; and when the first relationship query response comprises relational data, obtaining the relationship data; or when the first relationship query response comprises no relational data:

sending a relationship query request to the database to query for relational data;

receiving a second relationship query response from the database; and obtaining the relational data from the second relationship query response.

7. The data processing method of claim 4, wherein the data operation request is a data query request, and wherein the data processing method further comprises obtaining a data record set of all object instances in the object instance identifier list from the database based on the object instance identifier list.

8. The data processing method of claim 4, wherein when the data operation request is a data deletion request, the data processing method further comprises deleting, based on the object instance identifier list, index records that are of all object instances in the object instance identifier list and that are in the database and the cache apparatus.

9. A data processing apparatus, comprising:
a memory configured to store instructions; and
a processor coupled to the memory and configured to:
receive a data insertion request from service software, wherein the data insertion request comprises a data record, and wherein the data record comprises an object type identifier, a field value, a field identifier, and an object instance identifier;
generate a field index based on the object type identifier, the field value, the field identifier, and the object instance identifier;
generate a relationship index based on the object type identifier;
write the data record to a database; and
cache an index record and an operation for the index record into a cache apparatus in chronological order of the operation for the index record,
wherein the index record comprises the relationship index and the field index.

10. The data processing apparatus of claim 9, wherein the processor is further configured to:
obtain field metadata based on the object type identifier; and
generate the field index based on the field metadata, the field value, and the object instance identifier, wherein the field index comprises a unique index or a non-unique index.

11. The data processing apparatus of claim 9, wherein the processor is further configured to:
obtain relational metadata based on the object type identifier, wherein the relational metadata comprises a relationship between a parent object and a child object, and wherein the relationship between the parent object and the child object comprises an object type identifier of the parent object, an object type identifier of the child object, a field identifier associated with the parent object, and a field identifier associated with the child object;
obtain, from the relational metadata, the relationship and the object type identifier of the child object;
obtain a list of all child object instances from a parent object instance based on the object type identifier of the child object;
traverse the list of child object instances;
generate a relationship index for each pair of parent object instance and child object instance; and
generate a relationship index record based on all relationship indexes of the parent object, wherein the relationship index record comprises the object type identifier of the parent object, a parent object instance identifier, and all the relationship indexes of the parent object.

12. The data processing apparatus of claim 9, wherein the processor is further configured to:
receive a data operation request from the service software, wherein the data operation request comprises the object type identifier, the field value, and the field identifier;
obtain relational data based on the object type identifier, the field value, and the field identifier, wherein the relational data comprises object instance identifiers of all child objects associated with a parent object;
obtain an object instance identifier list based on the relational data, wherein the object instance identifier list comprises the object instance identifiers of all the child objects associated with the parent object in the relational data; and
perform a data operation on the database based on the object instance identifier list.

13. The data processing apparatus of claim 12, wherein the processor is further configured to:
query for field metadata based on the object type identifier and the field identifier;
determine that the field index is a unique index or a non-unique index;
generate an index query request, wherein the index query request comprises the object type identifier, the field identifier, and the field value; and
when the field index is the unique index:
send the index query request to the cache apparatus when the field index is the unique index;
receive a first index query response from the cache apparatus;
determine whether the first index query response comprises the object instance identifier; and
if the first index query response comprises the object instance identifier, obtain the relational data; or
if the first index query response does not comprise the object instance identifier:
send the index query request to the database if the first index query response does not comprise the object instance identifier;
receive a second index query response from the database; and
obtain the relational data when determining that the second index query response comprises the object instance identifier; or
when the field index is the non-unique index:
send the index query request to both the cache apparatus and the database when the field index is the non-unique index;
separately receive a third index query response from the cache apparatus and a fourth index query response from the database;
separately obtain an object instance identifier in the third index query response and an object instance identifier in the fourth index query response;
form an object instance identifier set, wherein the object instance identifier set comprises the object instance identifier in the third index query response and the object instance identifier in the fourth index query response; and
obtain the relational data.

14. The data processing apparatus of claim 13, wherein the processor is further configured to:
query for relational metadata based on the object instance identifier or the object instance identifiers in the object instance identifier set;
determine that an object corresponding to the object instance identifier comprises an associated child object;
send a relationship query request to the cache apparatus to query for relational data;
receive a first relationship query response from the cache apparatus; and
when the first relationship query response comprises relational data, obtaining the relational data; or
when the first relationship query response comprises no relational data:
send a relationship query request to the database to query for relational data;
receive a second relationship query response from the database; and
obtain the relational data from the second relationship query response.

15. The data processing apparatus of claim 12, wherein the data operation request is a data query request, and wherein the processor is further configured to obtain a data record set of all object instances in the object instance identifier list from the database based on the object instance identifier list.

16. The data processing apparatus of claim 12, wherein when the data operation request is a data deletion request, the processor is further configured to delete, based on the object instance identifier list, index records that are of all object instances in the object instance identifier list and that are in the database and the cache apparatus.

17. A non-transitory computer-readable storage medium, and when executed by a processor, cause a data processing apparatus to:
- receive a data insertion request from service software, wherein the data insertion request comprises a data record, and wherein the data record comprises an object type identifier, a field value, a field identifier, and an object instance identifier;
- generate a field index based on the object type identifier, the field value, and the object instance identifier;
- generate a relationship index based on the object type identifier;
- write the data record to a database; and
- cache an index record and an operation for the index record into a cache apparatus in chronological order of the operation for the index record, wherein the index record comprises the relationship index and the field index.

18. The non-transitory computer-readable storage medium of claim 17, wherein the instructions, when executed by the processor, cause the data processing apparatus to write the index record and the operation for the index record in the cache apparatus to the database when a predetermined time arrives.

19. The non-transitory computer-readable storage medium of claim 17, wherein the instructions, when executed by the processor, cause the data processing apparatus to:
- obtain field metadata based on the object type identifier; and
- generate the field index further based on the field metadata, wherein the field index comprises a unique index.

20. The non-transitory computer-readable storage medium of claim 17, wherein the instructions, when executed by the processor, cause the data processing apparatus to:
- obtain field metadata based on the object type identifier; and
- generate the field index further based on the field metadata, wherein the field index comprises a non-unique index.

* * * * *